United States Patent
Kazami

(10) Patent No.: US 8,264,572 B2
(45) Date of Patent: Sep. 11, 2012

(54) IMAGE PROCESSING APPARATUS AND ELECTRONIC CAMERA THAT REDUCE THE LENGTH OF TIME REQUIRED TO COMPLETE REPRODUCTION OF RECORDED IMAGE DATA

(75) Inventor: Kazuyuki Kazami, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/064,587

(22) Filed: Apr. 1, 2011

(65) Prior Publication Data

US 2011/0181756 A1    Jul. 28, 2011

Related U.S. Application Data

(63) Continuation of application No. 11/147,252, filed on Jun. 8, 2005, now abandoned, which is a continuation of application No. 09/497,474, filed on Feb. 4, 2000, now abandoned.

(30) Foreign Application Priority Data

Feb. 10, 1999 (JP) .......................... 11-33218

(51) Int. Cl.
H04N 5/76 (2006.01)
H04N 5/222 (2006.01)

(52) U.S. Cl. ................. 348/231.9; 348/333.11

(58) Field of Classification Search ............. 348/231.99, 348/231.7, 231.9, 333.01, 333.11
See application file for complete search history.

(56) References Cited

U.S. PATENT DOCUMENTS

| | | | |
|---|---|---|---|
| 5,153,730 | A | 10/1992 | Nagasaki et al. |
| 5,297,148 | A | 3/1994 | Harari et al. |
| 5,933,137 | A | 8/1999 | Anderson |
| 6,020,920 | A | 2/2000 | Anderson |
| 6,026,027 | A | 2/2000 | Terrell et al. |
| 6,049,850 | A | 4/2000 | Vishlitzky et al. |
| 6,469,738 | B1 | 10/2002 | Hayashi |
| 6,519,003 | B1 | 2/2003 | Swayze |
| 6,674,467 | B1 | 1/2004 | Lee |

FOREIGN PATENT DOCUMENTS

| | | |
|---|---|---|
| JP | A-06-133264 | 5/1994 |
| JP | A-08-070420 | 3/1996 |

OTHER PUBLICATIONS

Karedla, R. et al, "Catching strategies to improve disk system performance," Computer, vol. 27, No. 3, pp. 38-26, Mar. 1994.

Primary Examiner — Timothy J Henn
(74) Attorney, Agent, or Firm — Oliff & Berridge, PLC

(57) ABSTRACT

An electronic camera includes: an image capturing device that performs photoelectric conversion on a subject image formed by a photographic optical system and outputs image data; an image display device that displays an image based upon the image data; a first storage device achieving a first access speed; a second storage device achieving a second access speed lower than the first access speed; and a control device that, if image data for display are present in the first storage device when an image reproduction mode for displaying the image based upon the image data at the image display device is set, displays an image based upon the image data in the first storage device at the image display device, and if the image data for display are not present in the first storage device, displays an image based upon image data in the second storage device at the image display device.

11 Claims, 5 Drawing Sheets

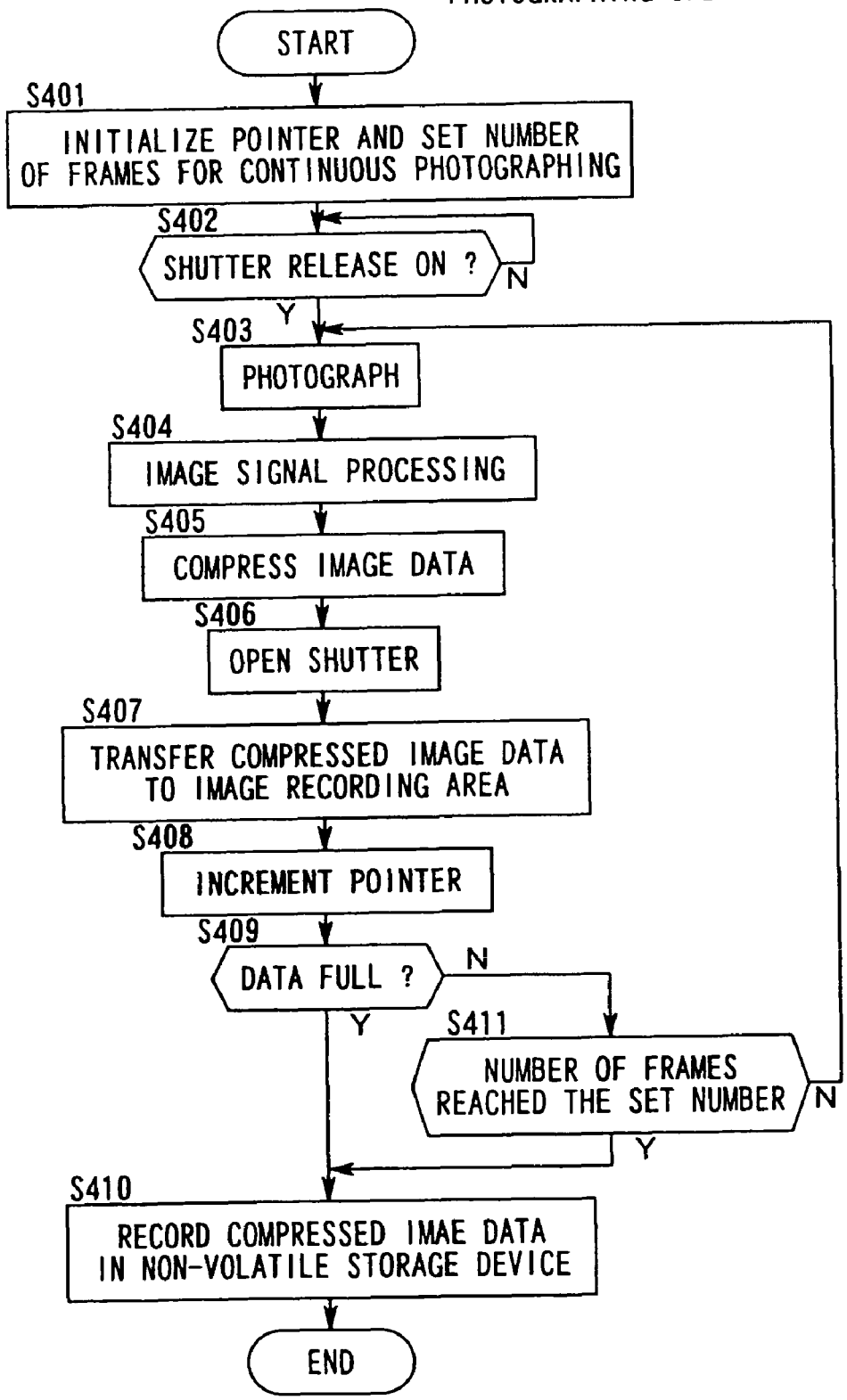

IMAGE PROCESSING APPARATUS AND ELECTRONIC CAMERA THAT REDUCE THE LENGTH OF TIME REQUIRED TO COMPLETE REPRODUCTION OF RECORDED IMAGE DATA

INCORPORATION BY REFERENCE

This is a Continuation of application Ser. No. 11/147,252 filed Jun. 8, 2005, which in turn is a Continuation of application Ser. No. 09/497,474 filed Feb. 4, 2000, which claims priority to Japanese Patent Application No. 11-033218 filed Feb. 10, 1999. The disclosures of the prior applications are hereby incorporated by reference herein in their entirety.

BACKGROUND OF THE INVENTION

1. Field of the Invention

The present invention relates to an image processing apparatus, and more specifically, it relates to an electronic camera provided with a display device which is capable of displaying an image obtained through photographing.

2. Description of the Related Art

An electronic camera records image data obtained through photoelectric conversion performed by an image-capturing element such as a CCD of a subject image formed by a photographic optical system. The image data are recorded in a non-volatile memory such as a flash memory which is either internally provided or externally mounted at the electronic camera. A non volatile memory does not require electric power to hold stored image data. Thus, a large volume of image data obtained through photographing can be stored and held within the electronic camera without causing the battery to become depleted.

In an electronic camera internally provided with a display device such as a TFT liquid crystal panel, image data obtained through photographing and recorded in the non-volatile memory can be read out and then displayed, i.e., reproduced at the liquid crystal display device. It is a highly convenient arrangement in that since the image can be viewed immediately after the photographing operation, a photographing operation can be performed again without delay if satisfactory photographing results are not achieved.

However, there is a problem in that when reproducing image data recorded as described above, a long time is required to complete the display of the image on the display device. The higher number of pixels at the image-capturing element and the low access speed of the non-volatile memory are main causes that make the image display a lengthy process. Namely, as the number of pixels at the image-capturing element increases, the volume of image data corresponding to one screen also increases. As a result, it sometimes takes more than one second to read out the large volume of image data from the non-volatile memory with its low access speed, which results in poor operability during an image reproduction operation at the electronic camera.

SUMMARY OF THE INVENTION

An object of the present invention is to provide an image processing apparatus and an electronic camera that achieve superior operability by reducing the length of time required to complete the reproduction of recorded image data.

In order to attain the above object, an electronic camera according to the present invention comprises: an image capturing device that performs photoelectric conversion on a subject image formed by a photographic optical system and outputs image data; an image display device that displays an image based upon the image data; a first storage device achieving a first access speed; a second storage device achieving a second access speed lower than the first access speed; and a control device that, if image data for display are present in the first storage device when an image reproduction mode for displaying the image based upon the image data at the image display device is set, displays an image based upon the image data in the first storage device at the image display device, and if the image data for display are not present in the first storage device, displays an image based upon image data in the second storage device at the image display device.

In this electronic camera, it is preferred that the first storage device is a volatile storage device and the second storage device is a non-volatile storage device.

Another electronic camera according to the present invention comprises: an image capturing device that performs photoelectric conversion on a subject image formed by a photographic optical system and outputs an image signal; an image signal processing device that outputs image data obtained by performing a predetermined type of processing on the image signal; a shutter release operation member operated to issue an instruction for a start of, a photographing operation; a photographing mode setting device that is operated to set a photographing mode which is either a single-shot photographing mode in which a single photographing operation is executed in response to one operation of the shutter release operation member or a continuous photographing mode which enables continuous execution of a plurality of photographing operations in response to a single operation of the shutter release operation member; a volatile storage device in which a storage area is secured to temporarily store the image data output by the image signal processing device when the continuous photographing mode is set; and a control device that stores a plurality of sets of image data obtained through a plurality of photographing operations in the storage area when the single-shot photographing mode is selected, and reproduces an image based upon the image data present in the storage area when a reproduction mode for reproducing images obtained through photographing is set.

In this electronic camera, it is preferred that in the continuous photographing mode, a continuous photographing operation is performed in response to a sustained operation of the shutter release operation member.

It is also preferred that in the continuous photographing mode, a photographing operation is performed continuously over a specific number of times that is set in advance in response to a single operation of the shutter release operation member.

An image processing apparatus according to the present invention comprises: an image capturing device that performs photoelectric conversion on a subject image formed by a photographic optical system and outputs image data; an image display device that displays an image based upon the image data; a temporary storage device that temporarily stores the image data; an image storage device for storing the image data, that holds the data even when power to the image processing apparatus is turned off; a reproduction mode setting device that sets a reproduction mode for displaying the image based upon the image data stored in the image storage device at the image display device; and a control device that, if image data for display are present in the temporary storage device when the reproduction mode is set by the reproduction mode setting device, displays the image based upon the image data in the temporary storage device at the image display device and if the image data for display are not present in the temporary storage device, displays an image based upon image data in the image storage device at the image display device.

In this image processing apparatus, it is preferred that an access time of the temporary storage device is shorter than an access time of the image storage device.

BRIEF DESCRIPTION OF THE DRAWINGS

FIG. 5 is a flowchart of another example of the electronic camera control procedure implemented in the continuous photographing mode.

DESCRIPTION OF THE PREFERRED EMBODIMENTS

Figure 1:
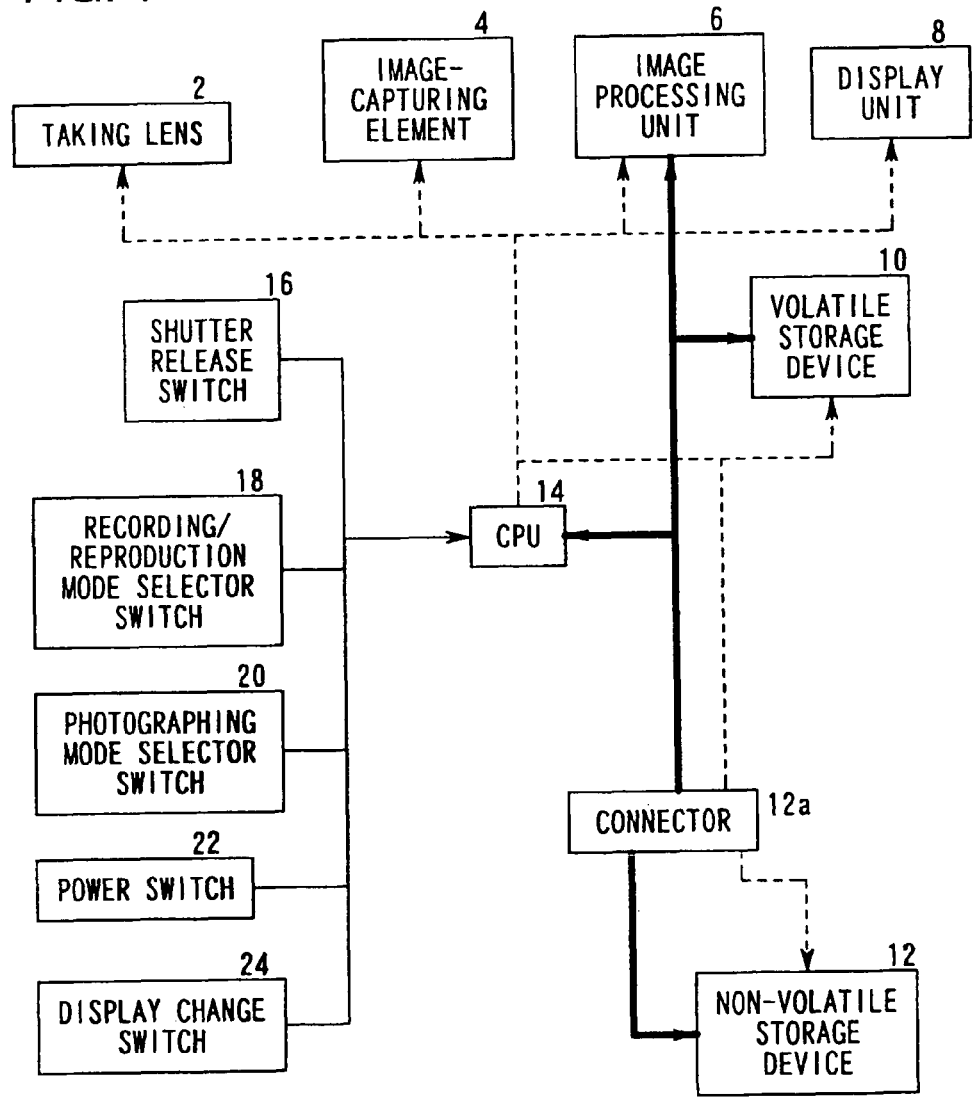
FIG. 1 illustrates a schematic internal structure of the electronic camera in a first embodiment of the present invention.

The internal structure of the electronic camera in an embodiment of the present invention is explained in reference to FIG. 1. A subject image formed by a taking lens 2 undergoes photoelectric conversion at an image-capturing element 4 constituted of a CCD or the like, and an image signal is output to an image processing unit 6. The image processing unit 6 performs A/D conversion on the image signal that has been input and displays an image based upon image data obtained through processing such as white balance adjustment and gradation correction at a display unit 8. In addition, the image processing unit 6 has a function of compressing and decompressing image data as explained below. Namely, the image processing unit 6 compresses the image data obtained through the processing described above and outputs the image data that have been compressed, i.e., the compressed image data, to a non-volatile storage device 12 that is detachably connected to the electronic camera main body via a connector 12a. Data can be read/written at the non-volatile storage device 12, i.e., the non-volatile storage device 12 can be accessed, both by the image processing unit 6 and a CPU 14 that is to be detailed later. The storage medium of the non-volatile storage device 12 may be a flash memory, a card-type hard disk or the like.

A shutter release switch 16, a recording/reproduction mode selector switch 18, a photographing mode selector switch 20, a power switch 22 and a display change switch 24 are connected to the CPU 14, which implements overall control of the operating sequence of the electronic camera. The shutter release switch 16 is operated by the photographer to issue a photographing start command to the electronic camera. The recording/reproduction mode selector switch 18 is provided for the photographer to set the electronic camera in a photographing mode or a reproduction mode in which an image obtained through photographing is displayed. The photographing mode selector switch 20 is provided for the photographer to set a single-shot photographing mode, in which a single photographing operation is performed in response to one operation of the shutter release switch 16, or a continuous photographing mode, which enables the execution of a plurality of photographing operations continuously, i.e., the execution of continuous shooting, in response to a single operation of the shutter release switch 16, when the electronic camera is operated in the photographing mode. The power switch 22 is used to turn on/off the power of the electronic camera. The display change switch 24 is operated to switch images displayed at the display unit 8 in the reproduction mode.

A volatile storage device 10, which is connected to both the image processing unit 6 and the CPU 14, can be accessed by the image processing unit 6 and the CPU 14. An SRAM, a DRAM or the like may be used as the recording medium of the volatile storage device 10. While the access speed of the volatile storage device 10, i.e., the length of time required for data read/write at the volatile storage device 10, is higher than the access speed of the non-volatile storage device 12, the information recorded at the volatile storage device 10 becomes lost once the power switch 22 is turned off. The non-volatile storage device 12, on the other hand, is characterized in that information recorded at the non-volatile storage device 12 is held even when the power switch 22 is turned off.

The storage area in the volatile storage device 10 is divided into two major areas, i.e., a work area that is used when the image processing unit 6 engages in white balance adjustment, gradation correction or image data compression/decompression as mentioned earlier and an image recording area that is used to temporarily record image data as detailed later. The image recording area has a capacity large enough to allow several sets of image data that have been compressed at the image processing unit 6 to be recorded.

Figure 2:
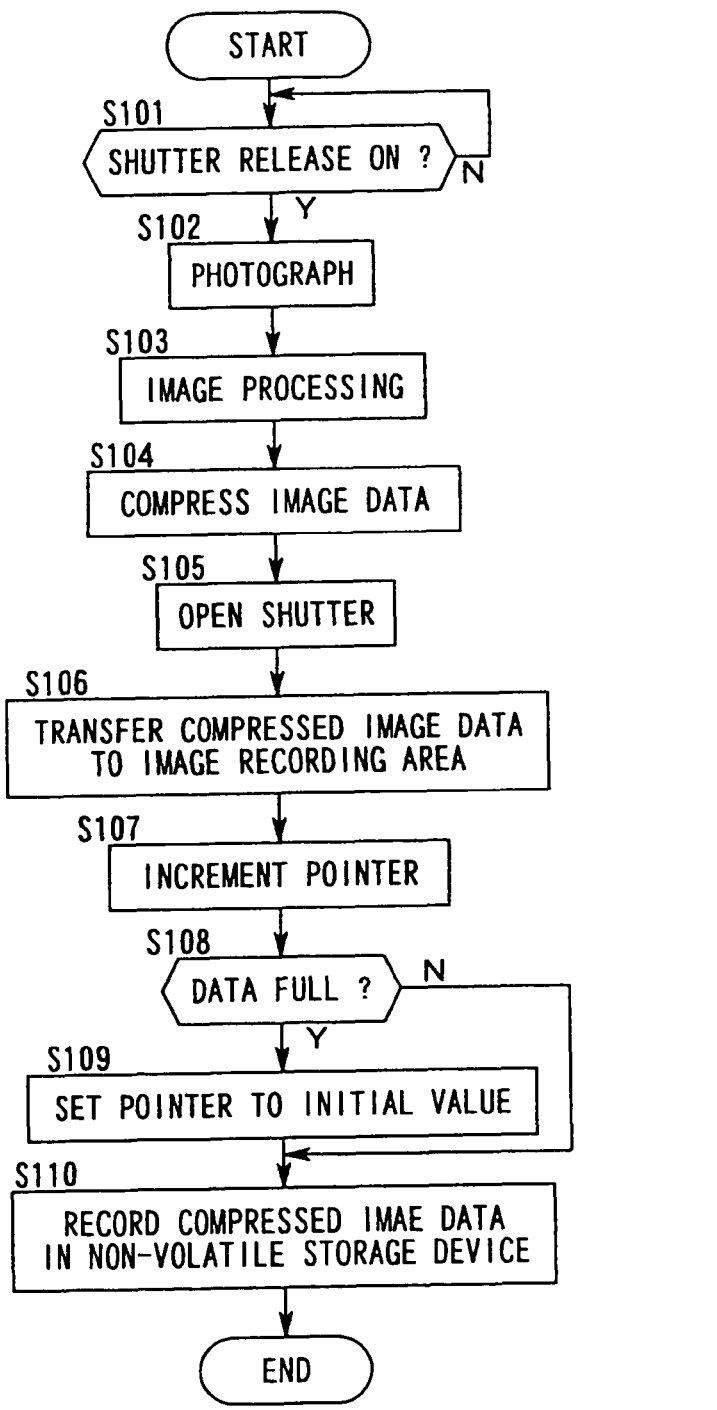
FIG. 2 is a flowchart of the electronic camera control procedure implemented in a single-shot photographing mode.

The photographing operation and the reproduction operation performed at the electronic camera structured as described above are now explained. The electronic camera operations are explained in order of (a), (b) and (c).
(a) Single-shot Photographing Operation
(b) Continuous Photographing Operation
(c) Reproduction Operation
(a) Single-Shot Photographing Operation FIG. 2 is a flowchart of the electronic camera control procedure executed by the CPU 14 when the recording/reproduction mode selector switch 18 is set to the photographing mode and the photographing mode selector switch 20 is set to the single-shot photographing mode. The electronic camera control procedure executed by the CPU 14 is explained below in reference to FIGS. 1 and 2.

In step S101, the CPU 14 makes a decision as to whether or not the shutter release switch 16 has been turned on. If an affirmative decision is made in step S101, the CPU 14 proceeds to step S102, whereas if a negative decision is made, it performs the decision-making in step S101 repeatedly. In step S102, the CPU 14 implements a photographing operation control sequence. Namely, the CPU 14 drives a focusing mechanism (not shown) internally provided at the taking lens 2 to achieve focal adjustment, and then implements closing control on a shutter (not shown) internally provided at the taking lens 2.

In step S103, the CPU 14 issues a command to the image processing unit 6 to process image signals output by the image-capturing element 4. The image processing unit 6 sequentially performs A/D conversion on the image signals output by the image-capturing element 4 and transfers the resulting image data to the work area in the volatile storage device 10. The image processing unit 6 then implements the processing described earlier on the image data in the work area.

In step S104, the CPU 14 issues an image compression command to the image processing unit 6. Upon receiving the image compression command from the CPU 14, the image processing unit 6 compresses the image data in the work area in conformance to an image compression processing algorithm such as JPEG to generate compressed image data.

In step S105, the CPU 14 opens the shutter that was closed in step S102. In step S106, the CPU 14 issues a command to the image processing unit 6 to transfer the compressed image data to the image recording area in the volatile storage device 10. In response to this command, the image processing unit 6 transfers the compressed image data to the image recording area in the volatile storage device 10. It is to be noted that the location in the image recording area in the volatile storage device 10 to which the compressed image data are to be transferred is specified by using a pointer that is to be detailed later.

In step S107, the CPU 14 increments the pointer. This pointer is provided to specify the address at the image recording area within the volatile storage device 10 to which the compressed image data are to be transferred. In other words, when the processing in step S107 is completed, a new compressed image data transfer address is set at the pointer. When the CPU 14 issues the command to the image processing unit 6 to transfer the compressed image data to the image recording area in the volatile storage device 10 in step S105, this information with respect to the pointer, too, is output to the image processing unit 6 from the CPU 14.

In step S108, the CPU 14 makes a decision as to whether or not the image recording area in the volatile storage device 10 is full. If an affirmative decision is made in step S108, the CPU 14 proceeds to step S109 to reset the pointer to the initial value. If a negative decision is made in step S108, on the other hand, the CPU 14 branches off to step S110.

In step S110, the CPU 14 issues a command to the image processing unit 6 to transfer the compressed image data present in the work area in the volatile storage device 10 to the non-volatile storage device 12. In response to this command, the image processing unit 6 transfers the compressed image data to the non-volatile storage device 12. When the processing from step S101 through step S111 explained above ends, the CPU 14 completes execution of the electronic camera control procedure in the single-shot photographing mode.

When the control procedure described above is executed repeatedly without turning off the power at the electronic camera, compressed image data are stored in the volatile storage device 10 as well as in the non-volatile storage device 12. In addition, when the image recording area in the volatile storage device 10 has become full, the oldest compressed image data are overwritten with the most recent compressed image data through the control procedure described above. Thus, the compressed image data of the most recent image group are recorded in the volatile storage device 10 at all times.

The access speed of the volatile storage device 10 is sufficiently higher than the access speed of the non-volatile storage device 12. Consequently, when an image is reproduced through a procedure to be described later, image display can be completed within a very short period of time by displaying the image corresponding to the compressed image data recorded in the image recording area in the volatile storage device 10 at the display unit 8.

In the explanation given above, an example in which the same compressed image data are recorded in both the volatile storage device 10 and the non-volatile storage device 12 is described. Recording of the same compressed image data as in this example may be achieved by making a slight modification to the existing program. Thus, since the program is simplified, it is not necessary to allocate a larger area in ROM or the like for storing the program. In addition, since the processing contents are also simplified, the program processing does not require a longer period of time and, as a result, the photographer is not forced to endure a longer wait.

If there are comfortable margins in the capacity of the ROM and the processing speed of the CPU 14, the image data stored at the volatile storage device 10 and the image data stored at the non-volatile storage device 12 may be compressed at different compression rates. Namely, a sufficiently high degree of display resolution is usually achieved at the display unit 8 internally provided at the electronic camera with several hundred thousands of pixels at most. Thus, when a so-called mega-pixel image-capturing element 4 having a million or more pixels is used, the compression rate for image data for display can be increased. By raising the compression rate of display image data in this manner, the number of images that can be recorded in the image recording area within the volatile storage device 10 can be increased.

(b) Continuous Photographing Operation

Figure 3:
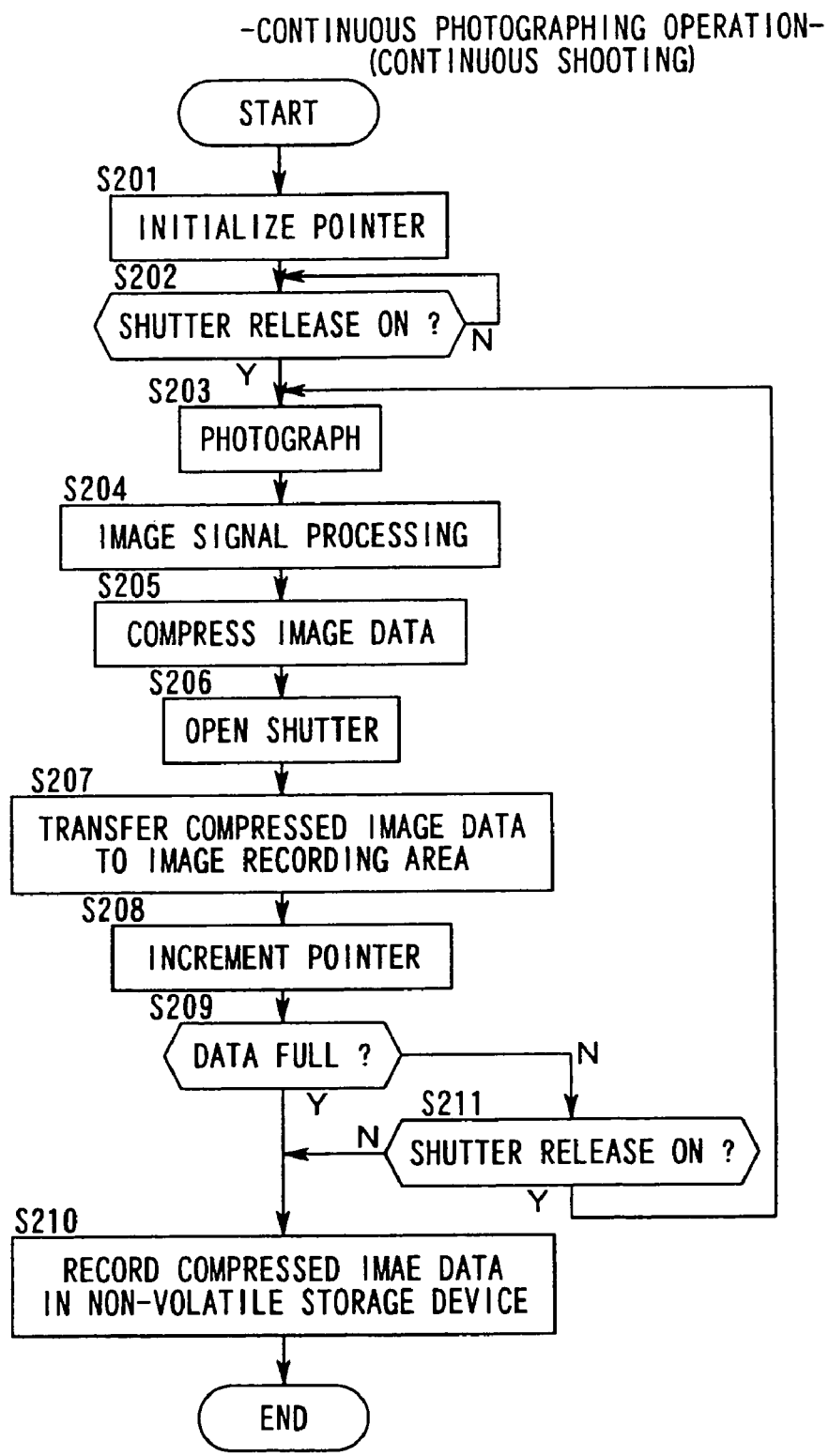
FIG. 3 is a flowchart of the electronic camera control procedure implemented in a continuous photographing mode.

FIG. 3 is a flowchart of the electronic camera control procedure executed by the CPU 14 when the recording/reproduction mode selector switch 18 is set to the photographing mode and the photographing mode selector switch 20 is set to the continuous photographing mode. The following is an explanation of the electronic camera control procedure executed by the CPU 14 given in reference to FIGS. 1 and 3.

In step S201, the CPU 14 initializes the pointer. This pointer fulfills a function similar to that explained in reference to (a) SingleShot Photographing Mode. Namely, it is provided to specify the leading address at the destination of transfer when compressed image data are transferred to the image recording area in the volatile storage device 10 as detailed later. When the pointer is initialized, the setting at the pointer is substituted by the highest order address value in the image recording area within the volatile storage device 10.

In step S202, the CPU 14 makes a decision as to whether or not the shutter release switch 16 has been turned on. If an affirmative decision is made in step S202, the CPU 14 proceeds to step S203, whereas if a negative decision is made, it performs the decision-making in step S202 repeatedly. In step S203, the CPU 14 implements a photographing operation control sequence. Namely, the CPU 14 drives the focusing mechanism (not shown) internally provided at the taking lens 2 to achieve focal adjustment, and then implements closing control on the shutter (not shown) internally provided at the taking lens 2.

In step S204, the CPU 14 issues a command to the image processing unit 6 to process image signals output by the image-capturing element 4. The image processing unit 6 sequentially performs A/D conversion on the image signals output by the image-capturing element 4 and transfers the resulting image data to the work area in the volatile storage device 10. The image processing unit 6 then implements the processing described earlier on the image data in the work area.

In step S205, the CPU 14 issues an image compression command to the image processing unit 6. Upon receiving the image compression command from the CPU 14, the image processing unit 6 compresses the image data in the work area in conformance to an image compression processing algorithm such as JPEG to generate compressed image data.

In step S206, the CPU 14 opens the shutter that was closed in step S203. In step S207, the CPU 14 issues a command to the image processing unit 6 to transfer the compressed image data to the image recording area in the volatile storage device 10. At this time, the CPU 14 also outputs pointer information to the image processing unit 6. In response to the command from the CPU 14, the image processing unit 6 transfers the compressed image data to the area specified by the pointer within the image recording area of the volatile storage device 10.

In step S208, the CPU 14 increments the pointer. In step S209, the CPU 14 makes a decision as to whether or not the image recording area in the volatile storage device 10 is full. This decision-making may be performed based upon whether or not the value at the pointer that is incremented every time a photographing operation ends has reached a specific value. Alternatively, the decision-making may be performed based upon whether or not the number of photographic frames recorded has reached the maximum number of available frames, which is determined in advance in correspondence to the capacity of the image recording area in the volatile storage device 10 and the capacity required to record compressed image data corresponding to one frame. If an affirmative decision is made in step S209, the CPU 14 proceeds to step S210. If a negative decision is made in step S209, on the other hand, the CPU 14 branches off to step S211 to make a decision as to whether or not the shutter release switch 16 continues to be in an ON state. If a negative decision is made in step S211, the CPU 14 proceeds to step S210, whereas if an affirmative decision is made, it returns to step S203 to sustain the continuous photographing operation.

In step S210, the CPU 14 issues a command to the image processing unit 6 to transfer the compressed image data present in the image recording area in the volatile storage device 10 to the non-volatile storage device 12. In response to this command, the image processing unit 6 transfers the compressed image data to the non-volatile storage device 12. When the processing from step S201 through step S211 explained above ends, the CPU 14 completes execution of the electronic camera control procedure in the continuous photographing mode.

As explained above, when the continuous photographing mode is set, the photographing operation is performed continuously without transferring compressed image data to the non-volatile storage device 12 each time an individual photographing operation is completed. Then, when the photographer turns off the shutter release switch 16 (step S211) or when the image recording area in the volatile storage device 10 has become full (step S209), the continuous photographing operation is stopped, and the compressed image data present in the image recording area in the volatile storage device 10 are sequentially transferred to the non-volatile storage device 12. By performing a continuous photographing operation while transferring compressed image data only to the image recording area of the volatile storage device 10 with a relatively high access speed and thus temporarily storing the compressed image data at the volatile storage device 10, the number of frames over which photographing is enabled per unit time, i.e., the frame speed, can be increased.

A more detailed explanation is given on the processing in step S201 executed by the CPU 14. It is to be noted that in the following explanation, an example in which the photographing mode is switched from the single-shot photographing mode to the continuous photographing mode without turning off the power of the electronic camera is used. If the single-shot photographing mode has been set before the setting is switched to the continuous photographing mode and a photographing operation has been performed even once in the single-shot photographing mode, there are compressed image data present in the image recording area within the volatile storage device 10. If the setting is subsequently switched to the continuous photographing mode, the CPU 14 initializes the pointer in step S201. Thus, when the continuous photographing operation is executed, the compressed image data recorded in the image recording area of the volatile storage device 10 during the photographing operation performed in the single-shot photographing mode are overwritten with compressed image data obtained through the continuous photographing operation. As a result, the maximum size of area can be secured to temporarily store compressed image data for the continuous photographing operation and the maximum number of photographic frames over which continuous photographing can be performed is increased.

It is to be noted that while the decision as to whether the continuous photographing operation is to be sustained or stopped is made based upon whether or not the shutter release switch 16 is in an ON state in this embodiment, the decision-making may be performed in the following manner, instead. Namely, the number of frames over which continuous photographing is to be performed may be set in advance prior to the start of a continuous photographing operation to perform a continuous photographing operation over the number of frames thus set in advance in response to a single operation of the shutter release switch 16. The procedure implemented in such a case is presented in the flowchart in FIG. 5. The flowchart in FIG. 5 represents another example of the continuous photographing operation performed in the embodiment. The flowchart in FIG. 5 differs from the flowchart in FIG. 3 only in the processing performed in step S401 and step S411. In step S401, the CPU 14 initializes the pointer and then accepts a setting operation performed by the photographer to set the number of frames for continuous photographing. In addition, in step S411, the CPU makes a decision as to whether or not the number of photographic frames for which photographing has been performed since the start of the execution of the continuous photographing operation has reached the number of frames set in step S401. These are the only differences from the continuous photographing operation in the flowchart in FIG. 3.

(c) Reproduction Operation

The electronic camera in the embodiments of the present invention can switch from the photographing mode to the reproduction mode without having to once turn off the power. When the camera is switched from the photographing mode to the reproduction mode without turning off the power, compressed image data recorded in the volatile storage device 10 in the photographing mode are not erased and are held intact. By displaying an image based upon the compressed image data held in the volatile storage device 10, the operability of the reproduction operation can be improved, as explained below.

Figure 4:
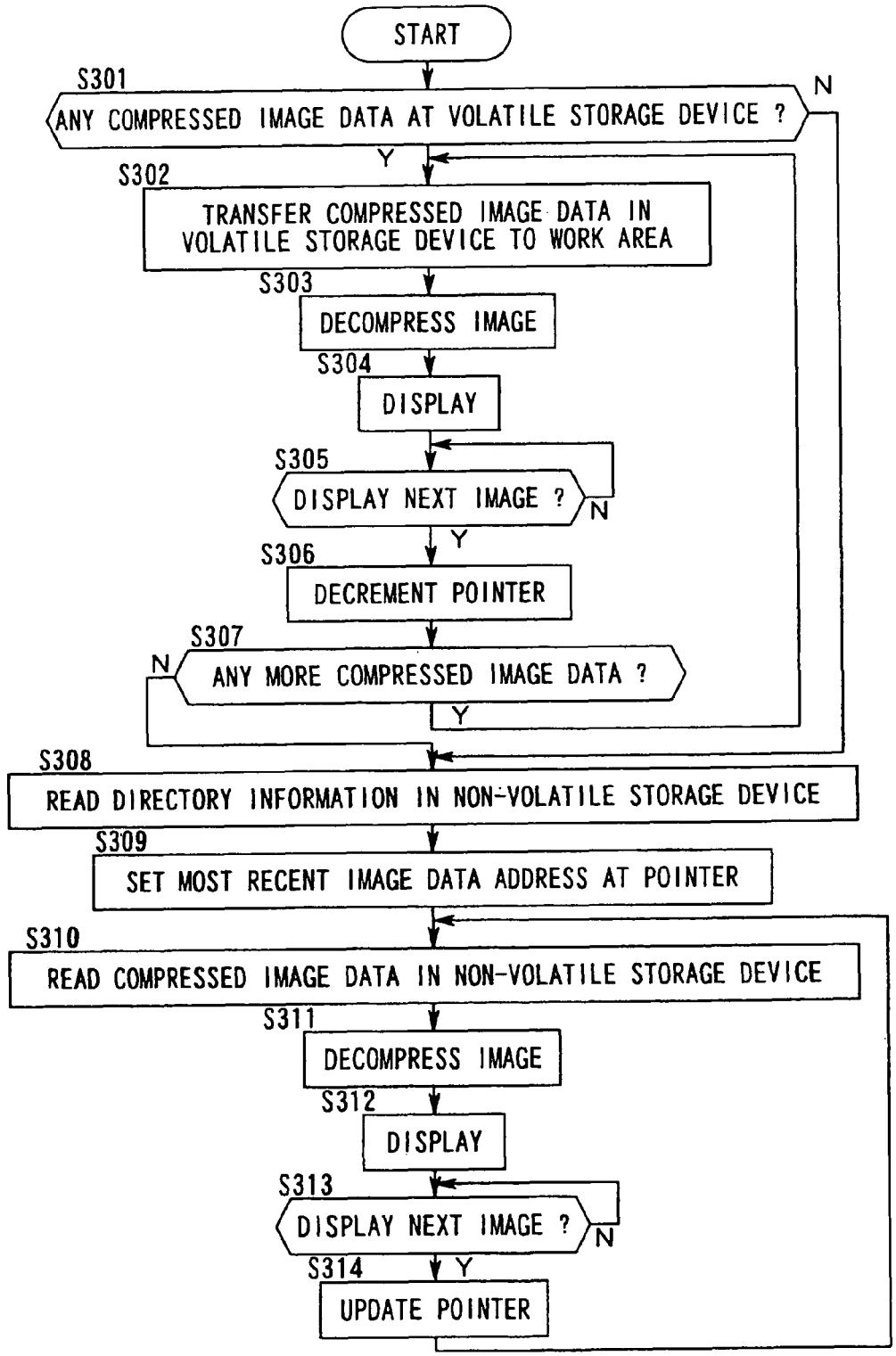
FIG. 4 is a flowchart of the electronic camera control procedure implemented in a reproduction mode.

FIG. 4 is a flowchart of the electronic camera control procedure executed by the CPU 14 when the recording/reproduction mode selector switch 18 is set to the reproduction mode. The control procedure in the flowchart shown in FIG. 4 ends when the recording/reproduction mode selector switch 18 is switched to the photographing mode. The following is an explanation of the electronic camera control procedure implemented during a reproduction operation executed by the CPU 14, given in reference to FIGS. 1 and 4.

In step S301, the CPU 14 makes a decision as to whether or not there are any compressed image data present in the image recording area of the volatile storage device 10. This decision-making is performed by the CPU 14 based upon the presence/absence of corresponding index information which is recorded together with a given set of compressed image data in the volatile storage device 10. If an affirmative decision is made, the CPU 14 proceeds to step S302, whereas if a negative decision is made, it branches off to step S308. The index information includes the compressed image data size, information that indicates the location in the volatile storage device 10 at which the compressed image data are recorded and information such as the photographing date. To explain further, an affirmative decision is made in step S301 if the power is not turned off while the electronic camera is being switched from the photographing mode to the reproduction mode and a photographing operation has been performed even for one frame with the electronic camera in the photographing mode.

In step S302, the CPU 14 issues a command to the image processing unit 6 to transfer compressed image data recorded in the image recording area of the volatile storage device 10 to the work area of the volatile storage device 10. At this time, the CPU 14 also outputs pointer information to the image processing unit 6. The image processing unit 6 receives the command and the pointer information. Then, it transfers the compressed image data specified by the pointer from the image recording area to the work area in the volatile storage device 10. It is to be noted that the pointer value in the photographing mode is directly carried over as the pointer value setting at this time unless the power is turned off while the electronic camera is being switched from the photographing mode to the reproduction mode. As a result, the first image displayed at the display unit 8 after the electronic camera is switched from the photographing mode to the reproduction mode is the image obtained in the last photographing operation performed. If, on the other hand, the power is turned off while the electronic camera is being switched from the photographing mode to the reproduction mode, the pointer is set to the initial value. In addition, all the compressed image data held in the volatile storage device 10 become erased. In this case, based upon the results of the decision-making in step S301, the processing branches off to step S308. Thus, the pointer is never set at the initial value when the CPU 14 executes the processing in step S302.

In step S303, the CPU 14 issues a decompression processing command to the image processing unit 6. Upon receiving the decompression processing command, the image processing unit 6 performs decompression processing on the compressed image data that have been transferred to the work area of the volatile storage device 10 in step S302.

In step S304, the CPU 14 issues an image display command to the image processing unit 6. In response to the image display command, the image processing unit 6 displays an image based upon the image data present in the work area of the volatile storage device 10 at the display unit 8.

In step S305, the CPU 14 makes a decision as to whether or not the display change switch 24 has been operated. As long as a negative decision is made in step S305, the CPU 14 repeats the decision-making in step S305. If, on the other hand, the operator operates the display change switch 24 to display the next image, an affirmative decision is made in step S305, and the CPU 14 proceeds to step S306.

In step S306, the CPU 14 decrements the pointer. In step S307, the CPU 14 makes a decision as to whether or not there is another set of compressed image data in the image recording area of the volatile storage device 10. This decision-making is performed based upon the presence/absence of index information recorded in the volatile storage device 10. Alternatively, it may be performed based upon the value at the pointer which has been decremented in step S306. If an affirmative decision is made in step S307, the CPU 14 returns to step S302 to display the next image at the display unit 8, whereas if a negative decision is made, it proceeds to step S308. In other words, if it is decided that there are no more compressed image data to be displayed in the image recording area of the volatile storage device 10, the CPU 14 executes the processing in step S308 and subsequent steps, which is to be explained below, to read out compressed image data from the non-volatile storage device 12 for display. During this processing, the CPU 14 reads compressed image data from the non-volatile storage device 12 by skipping any compressed image data with the same contents as those in the compressed image data in the image recording area of the volatile storage device 10. Thus, an image corresponding to a given set of compressed image data recorded at both the volatile storage device 10 and the non-volatile storage device 12 is never displayed repeatedly.

In step S308, the CPU 14 reads directory information recorded at the non-volatile storage device 12. In step S309, the CPU 14 substitutes the pointer setting with the leading address of the area where the most recent compressed image data are recorded in the non-volatile storage device 12 based upon the directory information read in step S308.

In step S310, the CPU 14 issues a command to the image processing unit 6 to transfer the compressed image data recorded in the image recording area of the non-volatile storage device 12 to the work area of the volatile storage device 10. At this time, the CPU 14 outputs the pointer information to the image processing unit 6. The image processing unit 6 receives the command and the pointer information. Then it transfers the compressed image data specified with the pointer from the non-volatile storage device 12 to the work area in the volatile storage device 10.

In step S311, the CPU 14 issues a decompression processing command to the image processing unit 6. Upon receiving the decompression processing command, the image processing unit 6 performs decompression processing on the compressed image data that have been transferred to the work area of the volatile storage device 10 in step S310.

In step S312, the CPU 14 issues an image display command to the image processing unit 6. In response to the image display command, the image processing unit 6 displays an image based upon the image data present in the work area of the volatile storage device 10 at the display unit 8.

In step S313, the CPU 14 makes a decision as to whether or not, the display change switch 24 has been operated. As long as a negative decision is made in step S313, the CPU 14 repeats the decision-making in step S313. If, on the other hand, the operator operates the display change switch 24 to display the next image, an affirmative decision is made in step S313, and the CPU 14 proceeds to step S314.

In step S314, the CPU 14 substitutes the pointer setting with the leading address of the area in the non-volatile storage device 12 where the compressed image data corresponding to the new image that follows the image currently displayed at the display unit 3 are recorded, and then returns to step S310.

As long as image data for display are present in the volatile storage device 10 with a relatively high access speed, the image corresponding to the image data present in the volatile storage device 10 is displayed through the control procedure executed by the CPU 14 when the electronic camera is set in the reproduction mode. If, on the other hand, no display image data are present in the volatile storage device 10, an image corresponding to image data in the non-volatile storage device 12 is displayed. By implementing image display in this manner, the length of wait time that must elapse until the image display at the display unit 8 is completed can be reduced to improve the operability of the electronic camera. In particular, in a situation in which a subsequent photographing operation is performed after images obtained by taking a plurality of shots are reproduced to check the results of the photographing operation, the plurality of reproduced images can be checked within a short period of time.

A specific photographing technique called "bracketing" may be employed in a photographing condition under which it is difficult to determine the optimal exposure value. In the bracketing method, a single scene is photographed a plurality of times while gradually changing the exposure value. The electronic camera in this embodiment, employed under these circumstances, enables comparison of the plurality of images obtained in the bracketing photographing operation through instantaneous switching, to facilitate selection of the best image.

While the explanation is given above in reference to the embodiment on an example in which compressed image data are recorded at both the volatile storage device 10 and the non-volatile storage device 12 and the compressed image data are decompressed during reproduction, the present invention is not limited to this example. In other words, it may be adopted in an apparatus in which uncompressed image data are recorded in both the volatile storage device 10 and the non-volatile storage device 12, or it may be adopted in an apparatus in which uncompressed image data are recorded in either the volatile storage device 10 or the non-volatile storage device 12 and compressed image data are recorded in the other.

In addition, a temporary file for display may be created through thinning processing implemented on the original image data obtained through the most recent photographing operation, i.e., the most recent photographic image data, to be stored in the volatile storage device 10. Then, when the image reproduction mode is set, the image data may be read out from the temporary file stored at the volatile storage device 10 for display at the display unit 8. Alternatively, the temporary file may be recorded at the non-volatile storage device 12, too. In this case, when the image reproduction mode is set, the temporary file is first read out from the non-volatile storage device 10 for display at the display unit 8.

While an example in which the power switch 24 and the recording/reproduction mode selector switch 18 are provided as separate switches is explained in reference to the embodiment, these switches may be provided as an integrated switch. Namely, a single switch through which the power is turned on/off and the photographing mode/reproduction mode is set may be provided. In this case, a 3-position switch may be employed. "Photographing," "Reproduction" and "OFF" should be assigned to the three positions, to achieve power on/off selection and recording/reproduction mode selection through one Operating member.

In addition, when the power switch 22 and the recording/reproduction mode selector switch 18 are integrated as described above, a state that is equivalent to the state in which the power switch 22 is turned on would correspond to either the photographing mode setting or the reproduction mode setting at the recording/reproduction mode selector switch 18. Thus, since only a position that indicates an OFF state for the power is required, the terminal at the position indicating an ON state for the power switch 22 which would be required when the recording/reproduction mode selector switch 18 and the power switch 22 are constituted of separate members can be omitted to achieve a cost reduction. It is to be noted that if the power off position is located between the photographing mode position and the reproduction mode position of the recording/reproduction mode selector switch 18 in the switch achieved by integrating the recording/reproduction mode selector switch 18 and the power switch 22, the power is temporarily turned off when the electronic camera is switched from the photographing mode to the reproduction mode and, as a result, the image data stored at the volatile storage medium cannot be held. Since the requirements explained in reference to the embodiment cannot be achieved in such a case, it should be ensured that the power off position is not set between the photographing mode position and the reproduction mode position. In other words, the switch positions should be set in the order of "OFF," "Reproduction," "Photographing" or in the order of "OFF," "Photographing," "Reproduction" instead of in the order of "photographing," "off," "reproduction."

As explained above, when the reproduction mode is set to reproduce images based upon the image data stored in the non-volatile storage device 12 (image storage device), if the image data to be reproduced are present in the volatile storage device 10 (temporary storage device) with a higher access speed, as well, reproduction is performed based upon the image data in the volatile storage device 10. Consequently, the length of time required for image reproduction can be reduced. Since the image is reproduced based upon image data in the non-volatile storage device 12 if there are no image data for reproduction present in the volatile storage device 10, the image can be reproduced in a reliable manner even if the image data in the volatile storage device 10 become lost by turning off the power of the electronic camera before the image reproduction mode is set, for instance.

In addition, the storage area secured in the volatile storage device 10 to temporarily store the image data output from the image signal processing unit 6 while the photographing mode at the electronic camera is switched to the continuous photographing mode is utilized as an area to store a plurality of sets of image data obtained through a plurality of photographing operations when the single-shot photographing mode is set. Then, by reproducing images based upon the image data in the storage area in the volatile storage device 10 when the reproduction mode is set, it is possible to display not a single frame of image obtained through the most recent photographing operation but a plurality of images in a short period of time. Thus, an electronic camera that achieves a high degree of operability when selecting the best image among a plurality of images and when setting the photographing conditions, the photographing angle and the like for a subsequent photographing operation based upon the results of a comparison of the plurality of images is provided.

It is to be noted that while the present invention is adopted in an electronic camera in the explanation given in reference to the embodiment, it is not limited to application in electronic cameras and may be adopted in a personal computer or the like to which a CCD camera or the like can be connected or which is internally provided with a CCD camera or the like. In other words, the present invention may be adopted in all types of image processing apparatuses that have a function of capturing a subject image, storing the image data and reproducing the subject image based upon the image data thus stored.

In addition, the control program executed by the CPU 14 is installed in a ROM or the like during the process of manufacturing the electronic camera in the embodiment under normal circumstances. However, the ROM in which the control program is installed may be a rewritable ROM so that by connecting the electronic camera to a computer or the like (not shown), an upgrade program can be obtained from a recording medium such as a CD ROM via the computer. In this case, the control program executed by the CPU 14 is recorded in a recording medium such as a CD ROM. In addition, an upgrade program can be obtained via the internet or the like in a similar manner. In such a case, the control program executed by the CPU 14 is provided in the form of a data signal on a carrier wave transmitted on a communication line.

In a personal computer that is internally or otherwise provided with the CCD camera described above, the program according to the present invention is provided via the CD ROM drive device, the Internet connection function or the like of the personal computer.

What is claimed is:

1. An electronic camera comprising:
an image capturing device that performs photoelectric conversion on a subject image formed by a photographic optical system and outputs image data;
an image display device that displays an image based upon the image data;
a thinning device that implements thinning processing on the image data output from the image capturing device;
a compressing device that compresses the image data output from the image capturing device, the compressing device configured to output compressed image data;
a first storage device achieving a first access speed and storing the compressed image data output from the compressing device and the thinned image data output from the thinning device, image data in the first storage device is configured to be erased when the electronic camera is powered off;
a second storage device achieving a second access speed, the second access speed being slower than the first access speed, and configured to store the compressed image data;
the first storage device holding the thinned image data even after the compressed image data has been output from the first storage device to the second storage device; and
a control device that:
when in a photographing mode that captures the subject image, the control device is configured to store, in the second storage device, the image data which was output from the image capturing device and holds the image data in the first storage device,
when switching from the photographing mode to an image reproduction mode that displays a reproduced image for display at the image display device and when the electric camera has not been powered off after the thinned image data is stored in the first storage device, the control device is configured to determine whether or not thinned image data corresponding to the reproduced image for display are present in the first storage device,
if thinned image data corresponding to the reproduced image for display are present in the first storage device, the control device is configured to display at the image display device the reproduced image for display based upon the thinned image data read from the first storage device,
if the thinned image data corresponding to the reproduced image for display are not present in the first storage device, the control device is configured to display at the image display device the reproduced image for display based upon the compressed image data read from the second storage device, and
when switching from the photographing mode to the image reproduction mode and when the electric camera has been powered off after the thinned image data is stored in the first storage device, the control device is configured to display at the image display device the reproduced image based upon the compressed image data read from the second storage device without first making a determination as to whether the thinned image data corresponding to the reproduced image for display are present in the first storage device.

2. The electronic camera according to claim 1, wherein:
the first storage device is a volatile storage device and the second storage device is a non-volatile storage device.

3. The electronic camera according to claim 1, wherein:
the first storage device holds the compressed image data to be overwritten.

4. The electronic camera according to claim 3, wherein:
the first storage device overwrites oldest compressed image data with most recent compressed image data when the first storage device has become full for storing compressed image data.

5. An image processing apparatus comprising:
an image capturing device that performs photoelectric conversion on a subject image formed by a photographic optical system and outputs image data;
an image display device that displays an image based upon the image data;
a thinning device that implements thinning processing on the image data output from the image capturing device;
a compressing device that compresses the image data output from the image capturing device, the compressing device configured to output compressed image data;
a temporary storage device that temporarily stores the compressed image data output from the compressing device and thinned image data output from the thinning device, image data in the temporary storage device is configured to be erased when the image processing apparatus is powered off;
an image storage device that stores the compressed image data output from the temporary storage device and holds the compressed image data even when power to the image processing apparatus is turned off;
the temporary storage device holding the thinned image data even after the compressed image data has been output from the temporary storage device to the image storage device;
a reproduction mode setting device that sets a reproduction mode for displaying an image based upon image data stored in the image storage device at the image display device; and
a control device that:
when in a photographing mode that captures the subject image, the control device is configured to store, in the image storage device, the image data output by the image capturing device and holds the image data in the temporary storage device,
when switching from the photographing mode to an image reproduction mode that displays a reproduced image for display at the image display device and when the image processing apparatus has not been powered off after the thinned image data is stored in the temporary storage device, the control device is configured to determine whether or not thinned image data corresponding to the reproduced image for display are present in the temporary storage device,
the control device is configured to display at the image display device the reproduced image for display based upon the thinned image data read from the temporary storage device if the thinned image data corresponding to the reproduced image for display are present in the temporary storage device,
the control device is configured to display at the image display device reproduced image for display based upon the compressed image data read from the image storage device if the thinned image data corresponding to the reproduced image for display are not present in the temporary storage, device, and when switching from the photographing mode to the image reproduction mode and when the image processing apparatus has been powered off after the thinned image data is stored in the temporary storage device, the control device is configured to display at the image display device the reproduced image based upon the compressed image data read from the image storage device without first making a determination as to whether the thinned image data corresponding to the reproduced image for display are present in the temporary storage device.

6. The image processing apparatus according to claim 5, wherein:

an access time of the temporary storage device is shorter than an access time of the image storage device.

7. The image processing apparatus according to claim 5, wherein:

the temporary storage device holds the compressed image data to be overwritten.

8. The image processing apparatus according to claim 7, wherein:

the temporary storage device overwrites oldest compressed image data with most recent compressed image data when the temporary storage device has become full for storing compressed image data.

9. An image processing apparatus for use with a subject image formed by a photographic optical system, comprising:

an image capturing device that performs photoelectric conversion on the subject image and outputs an image signal;

an image display device that displays an image based upon the outputted image signal;

a thinning device that implements thinning processing on the image data output from the image capturing device;

an image processing unit that compresses the image signal output from the image capturing device and transfers the compressed image data;

a temporary storage device that stores the compressed image data output from the image processing unit and thinned image data output from the thinning device at a first access speed, image data in the temporary storage device is configured to be erased when the image process apparatus is powered off;

an image storage device that stores the compressed image data at a second access speed lower than the first access speed, and stores the compressed image data regardless of whether power is supplied to the image processing apparatus; and a control device that:

is configured to issue a command to the image processing unit to transfer data from the temporary storage device to the image storage device, to determine the location of the compressed image data in the image storage device, and to locate the compressed image data and the thinned image data in the temporary storage device, when switching from the photographing mode to an image reproduction mode that displays a reproduced image for display at the image display device and when the image processing apparatus has not been powered off after the thinned image data is stored in the temporary storage device, the control device is configured to locate the compressed image data in the image storage device if the thinned image data corresponding to the reproduced image for display is not present in the temporary storage device; and when switching from the photographing mode to the image reproduction mode and when the image processing apparatus has been powered off after the thinned image data is stored in the temporary storage device, the control device is configured to locate the compressed image data in the image storage device without first trying to locate the thinned image data corresponding to the reproduced image for display in the temporary storage device wherein the temporary storage device stores the thinned image data regardless of when the compressed image data has been transferred from the temporary storage device to the image storage device by the control device.

10. The image processing apparatus according to claim 9, wherein:

the control device effectuates the transfer of compressed image data from the temporary storage device to the image storage device, regardless of the quantity of data the temporary storage device has stored.

11. The image processing apparatus according to claim 9, wherein:

the temporary storage device stores the compressed image data in linear order, when the temporary storage device is full of compressed data, it overwrites the compressed image data that is oldest with the compressed image data that is the most recent.

* * * * *